(12) United States Patent
Ma et al.

(10) Patent No.: US 7,809,813 B2
(45) Date of Patent: Oct. 5, 2010

(54) SYSTEM AND METHOD FOR PROVIDING CONTENT-ORIENTED SERVICES TO CONTENT PROVIDERS AND CONTENT CONSUMERS

(75) Inventors: Wei-Ying Ma, Beijing (CN); Yu Chen, Beijing (CN); Liang Sun, Sammamish, WA (US); Xing Xie, Beijing (CN); Chun Yuan, Beijing (CN); Hongjiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 10/184,438

(22) Filed: Jun. 28, 2002

(65) Prior Publication Data

US 2004/0003032 A1    Jan. 1, 2004

(51) Int. Cl.
G06F 15/173 (2006.01)
(52) U.S. Cl. .................................................. 709/223
(58) Field of Classification Search ......... 709/217–219, 709/246–247, 223; 711/118
See application file for complete search history.

(56) References Cited

U.S. PATENT DOCUMENTS

| | | | | |
|---|---|---|---|---|
| 5,924,116 | A * | 7/1999 | Aggarwal et al. | 711/122 |
| 6,009,475 | A * | 12/1999 | Shrader | 709/249 |
| 6,047,051 | A * | 4/2000 | Ginzboorg et al. | 379/130 |
| 6,049,821 | A * | 4/2000 | Theriault et al. | 709/203 |
| 6,185,625 | B1 * | 2/2001 | Tso et al. | 709/247 |
| 6,212,565 | B1 * | 4/2001 | Gupta | 709/229 |
| 6,237,031 | B1 * | 5/2001 | Knauerhase et al. | 709/221 |
| 6,336,117 | B1 * | 1/2002 | Massarani | 707/100 |
| 6,421,733 | B1 * | 7/2002 | Tso et al. | 709/246 |
| 6,438,576 | B1 * | 8/2002 | Huang et al. | 709/202 |
| 6,453,335 | B1 * | 9/2002 | Kaufmann | 709/203 |
| 6,567,893 | B1 * | 5/2003 | Challenger et al. | 711/118 |
| 6,604,143 | B1 * | 8/2003 | Nagar et al. | 709/229 |
| 6,611,875 | B1 * | 8/2003 | Chopra et al. | 709/245 |
| 6,654,786 | B1 * | 11/2003 | Fox et al. | 709/203 |
| 6,658,463 | B1 * | 12/2003 | Dillon et al. | 709/219 |
| 6,766,377 | B1 * | 7/2004 | Grabelsky et al. | 709/238 |
| 6,785,728 | B1 * | 8/2004 | Schneider et al. | 709/229 |

(Continued)

OTHER PUBLICATIONS elsevier.com—Web caching and content delivery, description of proceedings which are availalble for purchase.*

(Continued)

Primary Examiner—Benjamin R Bruckart
(74) Attorney, Agent, or Firm—Perkins Coie LLP (57) ABSTRACT

A content service network for providing content-oriented services over the Internet or similar networks comprises a service delivery overlay having a plurality of application servers and a content delivery network overlay having a plurality of service-enabled proxies in content delivery paths between content providers and content consumers. The service delivery overlay and the content delivery network collaborate to provide content-oriented processing, such as adaptive video delivery, content personalization, language translation, etc. The content service network accepts subscriptions from content providers and content consumer. For each subscription, service instructions including service binding data for binding the subscribed services with the subscriber's identity are generated and distributed to the service-enabled proxies. When a service-enabled proxy detects that a message passing therethrough requires a subscribed service, it retrieves service instructions for the service and renders the service either by making a remote call to an application service or by invoking a local execution module.

19 Claims, 7 Drawing Sheets

U.S. PATENT DOCUMENTS

| | | | | |
|---|---|---|---|---|
| 6,816,719 | B1* | 11/2004 | Heinonen et al. | 455/403 |
| 6,895,425 | B1* | 5/2005 | Kadyk et al. | 709/203 |
| 6,922,258 | B2* | 7/2005 | Pineau | 358/1.15 |
| 6,925,481 | B2* | 8/2005 | Singhal et al. | 709/200 |
| 2002/0049806 | A1* | 4/2002 | Gatz et al. | 709/203 |
| 2002/0083157 | A1* | 6/2002 | Sekiguchi et al. | 709/219 |
| 2002/0099829 | A1* | 7/2002 | Richards et al. | 709/227 |
| 2002/0107911 | A1* | 8/2002 | Lipton et al. | 709/203 |
| 2002/0143819 | A1* | 10/2002 | Han et al. | 707/513 |
| 2002/0178271 | A1* | 11/2002 | Graham et al. | 709/229 |
| 2002/0184302 | A1* | 12/2002 | Prueitt et al. | 709/203 |
| 2002/0184368 | A1* | 12/2002 | Wang | 709/226 |
| 2003/0069848 | A1* | 4/2003 | Larson et al. | 705/50 |
| 2003/0135468 | A1* | 7/2003 | Barbir et al. | 705/64 |
| 2004/0049598 | A1* | 3/2004 | Tucker et al. | 709/246 |

OTHER PUBLICATIONS

Ma et al, "Content Services Network: The Architecture and Protocols," 2001, (pp. 83-101).
Tomlinson et al., "A Model For Open Pluggable Edge Services," Network Working Group, Nov. 20, 2001 (29 pgs.).
Beck et al., "Enabling the Internet to Deliver Content-Oriented Services," Bell laboratories/Lucent Technologies (9 pgs.), 2001.
Cao et al., "Active Cache: Caching Dynamic Contents on the Web" (16 pgs.), 1999.
Elson et al., "ICAP: the Internet Content Adaptation Protocol," Jun. 2001 (40 pgs.).
Tsimelzon et al., "W3C®, ESI Language Specification 1.0," Aug. 4, 2001 (12 pgs.).
<esi>, Edge Side Includes, "Welcome" (1 pg.), Oct. 11, 2004.
Gudgin et al., "W3C® SOAP Version 1.2 Part 1: Messaging Framework," Oct. 2, 2001 (35 pgs.).
OASIS: "About UDDI," 2 pgs. Oct. 11, 2004.

* cited by examiner

SYSTEM AND METHOD FOR PROVIDING CONTENT-ORIENTED SERVICES TO CONTENT PROVIDERS AND CONTENT CONSUMERS

TECHNICAL FIELD

This invention relates generally the delivery of contents over a wide-area network such as the Internet, and more particularly to a framework for providing content-oriented services to enhance or modify contents sent by content providers to content consumers.

BACKGROUND OF THE INVENTION

As the usage of the Internet expands and many new types of services are provided on the Internet, the Internet is moving toward a service-centric model. Accompanying this trend, more and more storage and computational resources are being put into the network infrastructure of the Internet for providing services to customers. For instance, in the past few years, there has been a tremendous amount of investments in developing content delivery networks (CDNs) as a network overlay infrastructure service available to content providers and network access providers (e.g., ISPs). The content delivery networks provide a large number of caches and storage devices installed in servers located at the edge of the Internet network structure for pushing contents at a point closer to the content consumer, thereby allowing fast and reliable content delivery.

In addition to improved content delivery, content providers and consumers are interested in value-added services that operate on the content (or the content request) on its way between the content origin (e.g., a Web site) and the content consumer. Such services are often referred to as "content-oriented services" (or sometimes "content services") and include, for example, content adaptation, content personalization, watermarking, location-aware data insertion, etc. The edge servers of the content delivery network, being already positioned in the content delivery paths, offer a natural place to extend the capability of network intermediaries to provide content-oriented services. There are, however, many challenging issues in designing a framework for such a network for content-oriented services that have to be resolved. For instance, one main issue is how to make the services available to those who want to use the services, and another related main issue is how to ensure that the content sent or requested by a customer of the services will receive the intended processing.

SUMMARY OF THE INVENTION

In view of the foregoing, the present invention provides a content service network for providing content-oriented services that may be used by both content providers and content consumers on a wide-area network such as the Internet. The content service network includes two separate overlay networks: a service delivery overlay and a content delivery network. The content delivery network includes a plurality of service-enabled proxies that are positioned as edge servers in content delivery paths for providing content caching service. The proxies are "service enabled" in the sense that they are capable of providing additional processing (defined by the particular services they offer) to the messages flowing through them, rather than simply caching and forwarding contents as conventional caching proxies do. The service delivery overlay includes a plurality of application servers for processing contents to render the content-oriented services, and at least one service management server that manages service subscription.

When a customer subscribes to the services provided by the content service network, the service management server translates the service agreement into service binding data that describe the association between the subscribed service and subscriber information, which may be a user identity when the subscriber is an end user or a domain name or media objects when the subscriber is a content provider. Service instructions, which include the service binding data and conditions for rendering the subscribed service are then distributed to the service-enabled proxies in the content delivery overlay. Each service-enabled proxy monitors content messages passing through it and determines whether they require services according to the service binding information and conditions in the service instructions. If a message and its related context satisfy the service conditions, the proxy may provide the service locally or pass the message and related parameters to an application server in the service delivery overlay to render the required content-oriented service. The processed result is then forwarded by the proxy to the original destination of the content message.

DETAIL DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

Figure 1:
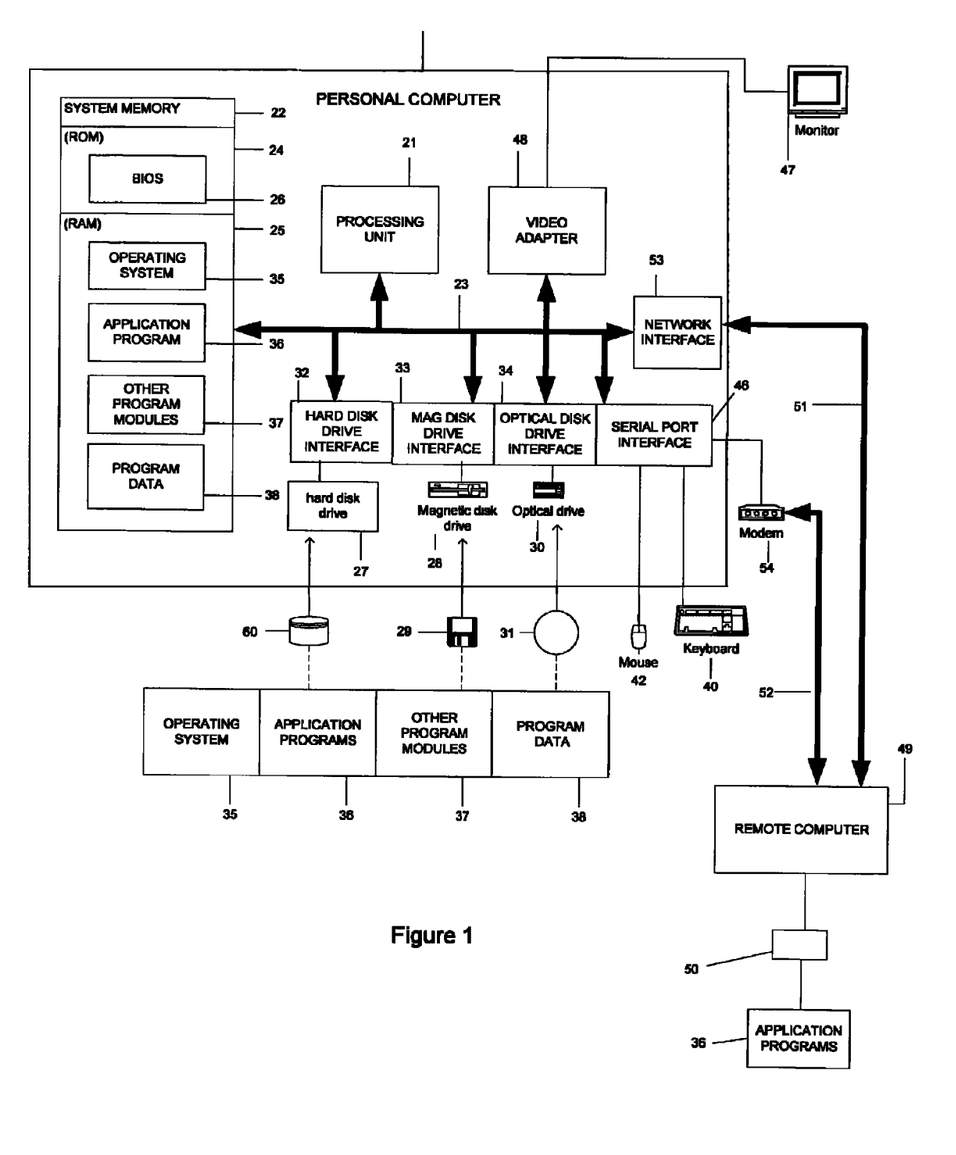
FIG. 1 is a block diagram generally illustrating an exemplary computer system on which the present invention may be implemented.

The following description begins with a description of a general-purpose computing device that may be used in an exemplary system for implementing the invention, and the invention will be described in greater detail with reference to FIGS. 2-7. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
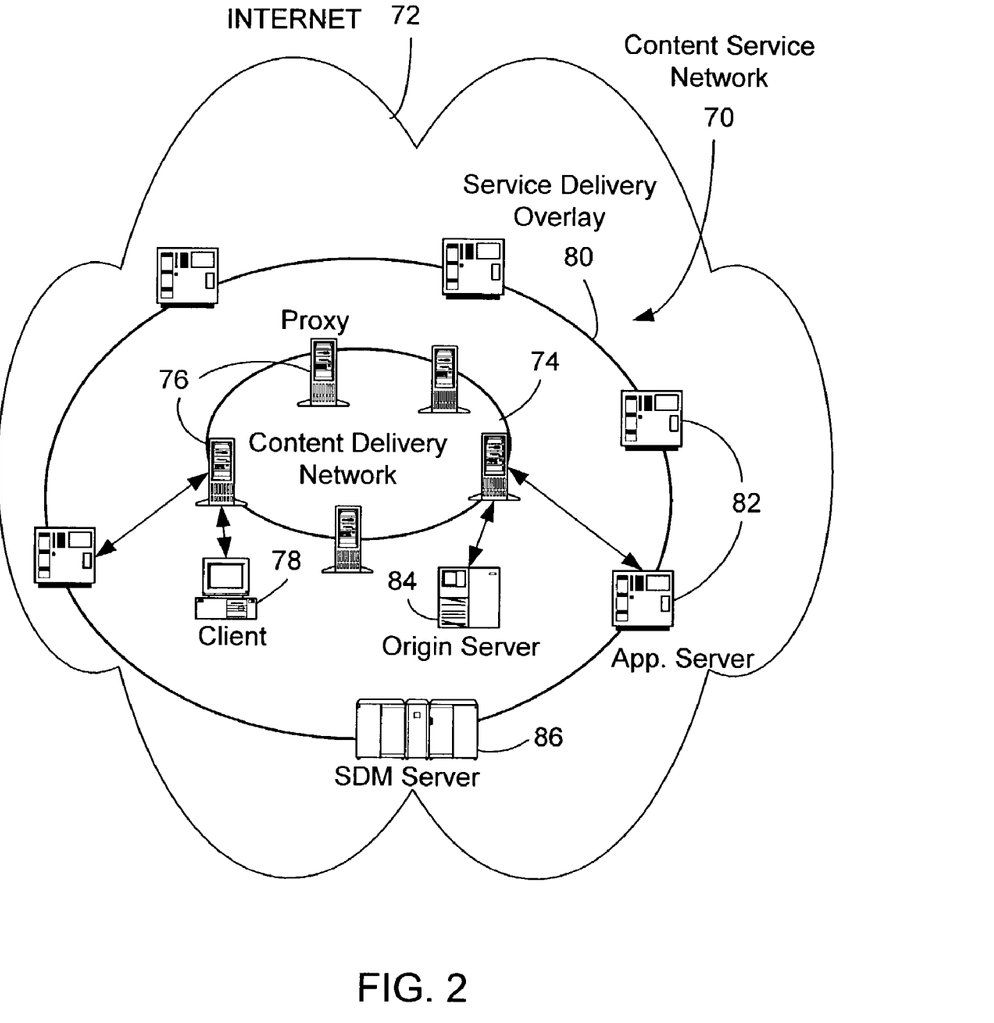
FIG. 2 is a schematic diagram showing a content service network embodying the invention that includes a service delivery network and a content delivery network as overlays on a wide-area network, such as the Internet, for providing content-oriented services.

Referring now to FIG. 2, the present invention is directed to a framework of a content service network 70 that has edge servers positioned in content delivery paths between content providers (e.g., Web sites) and content consumers (e.g., end users) on a network, such as the Internet, to process content requests or contents being delivered to provide content-oriented services. In this regard, the content service network (CSN) 70 is an infrastructure service that functions as an intermediary between the content providers and content consumers for providing value-added services. There are many types of content-oriented services that can be provided by the content service network. Exemplary types of content-oriented services include: blocking of requests for Web pages with bad contents, personalizing contents, adaptation of Web pages for viewing by small Internet devices, transcoding of video streams for viewing on wireless mobile devices, language translation on the contents of Web pages, etc. The content service network of the invention has been designed for deployment on the Internet to effectively provide content-oriented services. It will be appreciated, however, that the content service network can also be advantageously deployed in other large networks, such as the internal networks of large organizations.

The content-oriented services provided by the content service network are accessible to a broad spectrum of customers that may be content providers, end users, Internet Service Providers (ISPs), or traditional content delivery network providers. To use the service, the customers subscribe to available services provided by the content service network. The service agreements of the subscribers are then unloaded to the edge servers to instruct them to render the subscribed services on content requests and/or content data flowing through them. As will be described in greater detail below, in accordance with a feature of the invention, the content service network provides a mechanism for binding subscribed services with contents to enable service-enabled proxies of the content service network to perform necessary actions on content requests and/or contents being delivered to render desired content-oriented services.

As shown in FIG. 2, the content service network 70 comprises two layers of network infrastructures that are overlaid on a network 72 (e.g., the Internet) connecting the content providers and content consumers. One layer is called the "content delivery network" 74, which includes a plurality of service-enabled proxies 76 deployed at the edge of the network and used as distribution channels to push contents closer to the end user 78. The other layer, called the "service delivery overlay" 80, includes a plurality of application servers 82 for processing the contents being delivered via the content delivery network. In this regard, there are mainly two types of edge servers in the content service network framework: the service-enabled caching proxies 76 of the content delivery network 74 and the application servers 82 of the service delivery overlay 80 that act as remote call-out servers for the service-enabled proxies. As will be described in greater detail below, the service-enabled proxies 76 of the content delivery network 74 collaborate with the application servers 82 in the service delivery overlay 80 to inject content-oriented services into the content delivery paths. In a preferred embodiment, the two layers communicate with one another by means of messages under the Simple Object Access Protocol (SOAP).

In the content delivery network 74, contents from different content providers are replicated to a set of edge servers housing the service-enabled proxies based on estimated demand and a caching policy. Content requests from a client machine 78 of a user are routed to a service-enabled proxy 76, which forwards the request to a content origin server 84 if the requested content is not found in the cache of the proxy. The content sent by the origin server 84 is also routed first to the proxy 76, which caches the cacheable parts of the content and forwards the content to the requesting user. In a preferred embodiment, the DNS-based redirection technology is used to ensure that the network and server loads are balanced. It also ensures the availability of the contents by making multiple copies within the distribution network.

Figure 3:
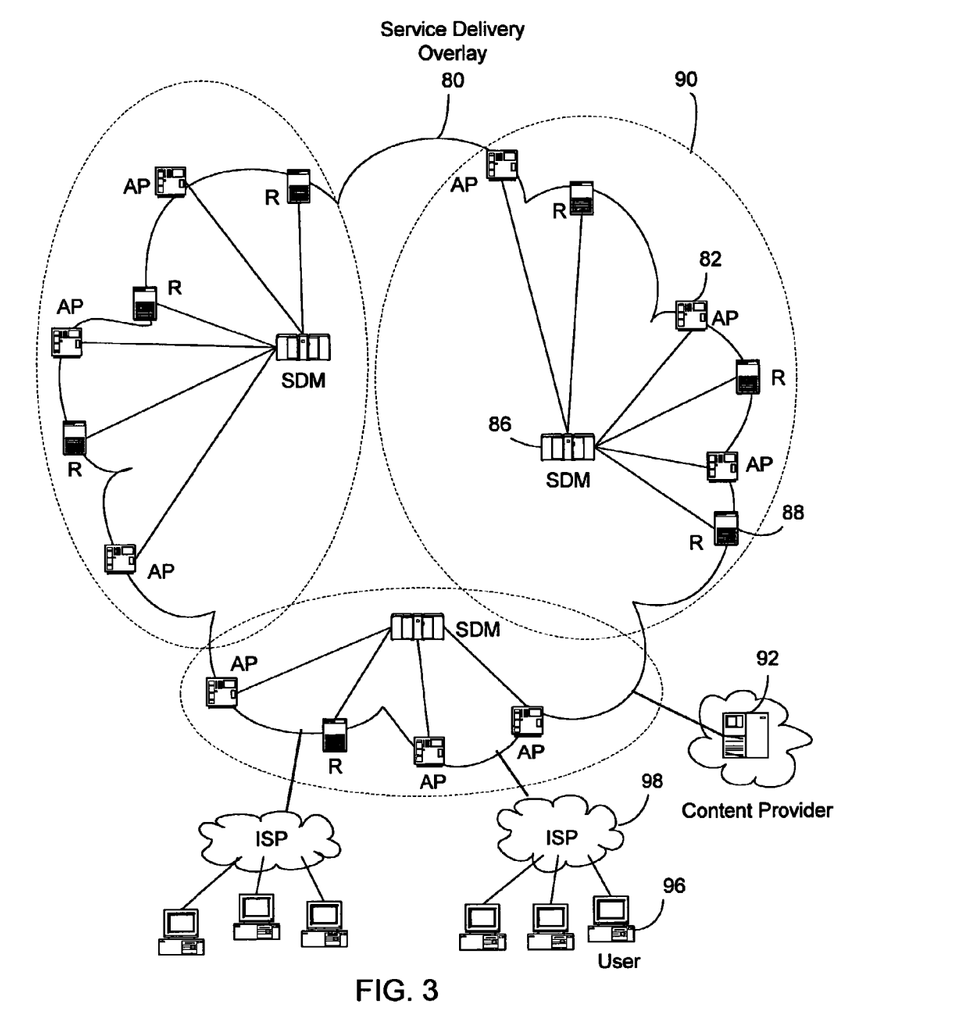
FIG. 3 is a schematic diagram showing the structure of an embodiment of the service delivery overlay.

The service delivery layer, on the other hand, provides the distribution channels for pushing applications for services (e.g., media processing and transcoding) to the edge of the network 72. FIG. 3 shows the structure of an embodiment of the service delivery overlay 80. As shown in FIG. 3, it contains three main types of elements: application servers (AP) 82, service delivery and management (SDM) servers 86, and redirection (R) servers 88. Each SDM server 86 is in charge of a domain 90, which includes a plurality of application servers 82 and redirection servers 88. Each domain is at the edge of the network 72 close to the end users 96. For instance, as shown in FIG. 3, the domain 90 is connected to an Internet service provider 98 (ISP) through which multiple users access the network.

The application servers 82 host the software for processing contents to provide content-oriented services. They provide computational resources for processing contents delivered via the content service network 70 on behalf of content providers or the content consumers that use the services. As described in greater detail below, they are called by the service-enabled proxies in the content delivery network to process messages identified by the proxies as requiring content-oriented services.

The SDM servers 86 are responsible for several tasks. They register and publish content-oriented services provided by service providers. They distribute the applications within the service delivery layer by replicating the corresponding service software to a set of edge servers based on the estimated demand. After the initial service registration, publication an distribution, the SDM servers continue to monitor the performance of each service and dynamically adapt the scale of distribution and deployment of the service according to the demand for it. The SDM servers also aggregate information about usage of the servers and provide the information to the redirection servers. The redirection servers use this information to perform network and server load balancing. The SDM servers also provide management, accounting, and billing functionalities to service providers. Each SDM is responsible for collecting information about its domain and periodically exchanges the information with other SDM servers. Furthermore, as described in greater detail below, the SDM servers are also responsible for providing services instructions, which include service-content binding information and conditions for rendering the services, to the service-enabled proxies in the content delivery network.

The redirection servers are responsible for directing service requests to the application servers according to a number of attributes and measurements. They receive such information from the SDM servers. The application servers and SDM servers in the service delivery layer communicate with the service-enabled caching proxies 76 in the content delivery network 74 to complete service subscription and rendering, as will be described in greater detail below.

Figure 4:
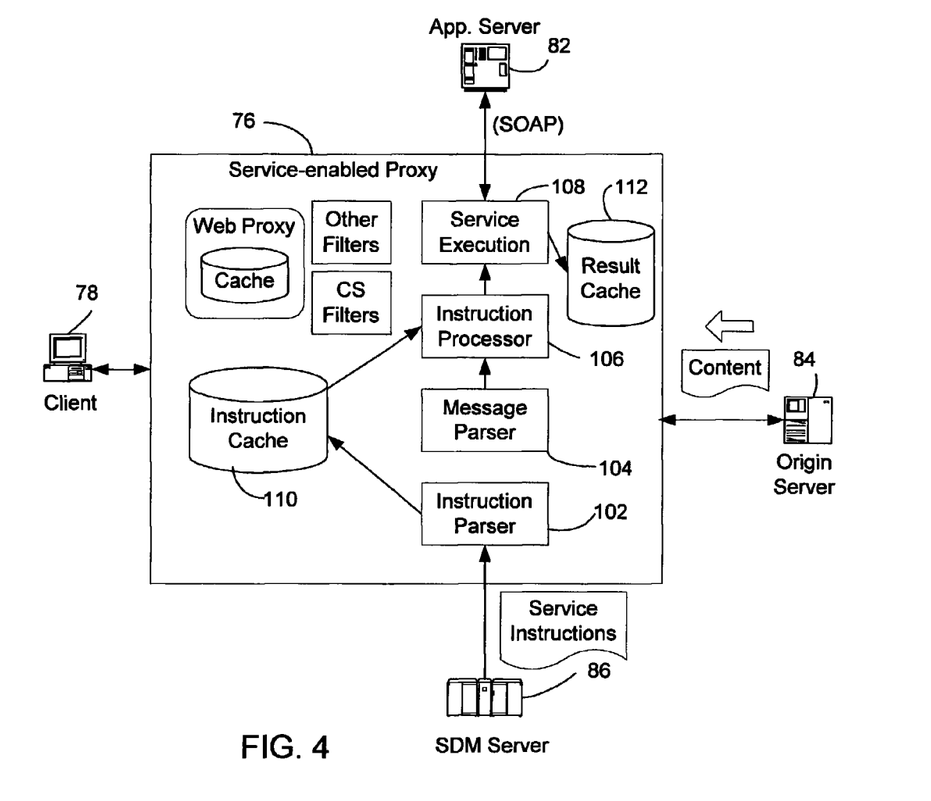
FIG. 4 is a schematic diagram showing components of a service-enabled proxy in the content delivery network illustrated in FIG. 2.

Referring now to FIG. 4, the caching proxies 76 in the content-delivery layer are "service-enabled" because they are capable of providing additional processing (defined by the particular services they offer) to the messages flowing through them, rather than simply caching and forwarding contents as conventional caching proxies do. They interact with the service delivery overlay 80 of the content service network 70 to carry out the rendering of content-oriented services. In one embodiment as shown in FIG. 4, the service-enabled proxy 76 includes the following main components: (1) an instruction parser 102; (2) a message parser 104; (3) an instruction processor 106, (4) a service execution module 108; (5) an instruction cache 110; and (6) a result cache 112.

To enable the service-enabled proxies to provide content-oriented services on contents passing therethrough, service instructions are transferred from the SDM servers 86 to the service-enabled proxies 76. The instructions represent service subscription information from content providers or end users. The instruction parser module 102 compiles the instructions received from the SDM servers and stores the parsed instructions in the local instruction cache 110.

During the run time, a registered type of message will trigger the proxy 76 to activate the message parser 104, which will then parse the message (e.g., a HTML request or response) to extract the necessary information, such as a content type or language of the content, for rendering the appropriate service. The massage is matched against the service binding data of the instructions in the instruction cache to identify a service to be performed on the message. By way of example, the message may be sent by an origin server and contain the domain name of the content provider. If this domain name matches the domain name in the service binding data of a service instruction, then the service specified in that instruction may be rendered on the message, depending on whether the conditions in the instruction are met. The instruction processor 106 then loads the related instruction for the identified content-oriented service from the instruction cache 110. It calls the local service execution module 108 to execute the instruction. The local service execution module 108 of the proxy is only meant to perform lightweight processing. If necessary as indicated in the instruction, the service execution module will be employed to invoke a remote service in the application servers 82 in the service delivery overlay through the SOAP protocol. After the processing is performed on the contents being delivered, the results can be stored in the result queue for future use.

Several steps are involved in providing content-oriented services at the edge of the network 72. First, content-oriented services are registered and deployed in the edge servers, which include application servers 82 in the service delivery layer 80 and the service-enabled caching proxy 76 in the content delivery layer 74. The next step is for service subscribers to specify which services should be provided for them. For instance, the services provided (i.e., how the content is to be processed) may be bound to the domains of the content providers, the media objects, or user identities. The services are then applied by the edge servers during the run time on contents passing therethrough according to the service instructions. The operations to accomplish these steps are described in greater detail as follows.

Figure 5:
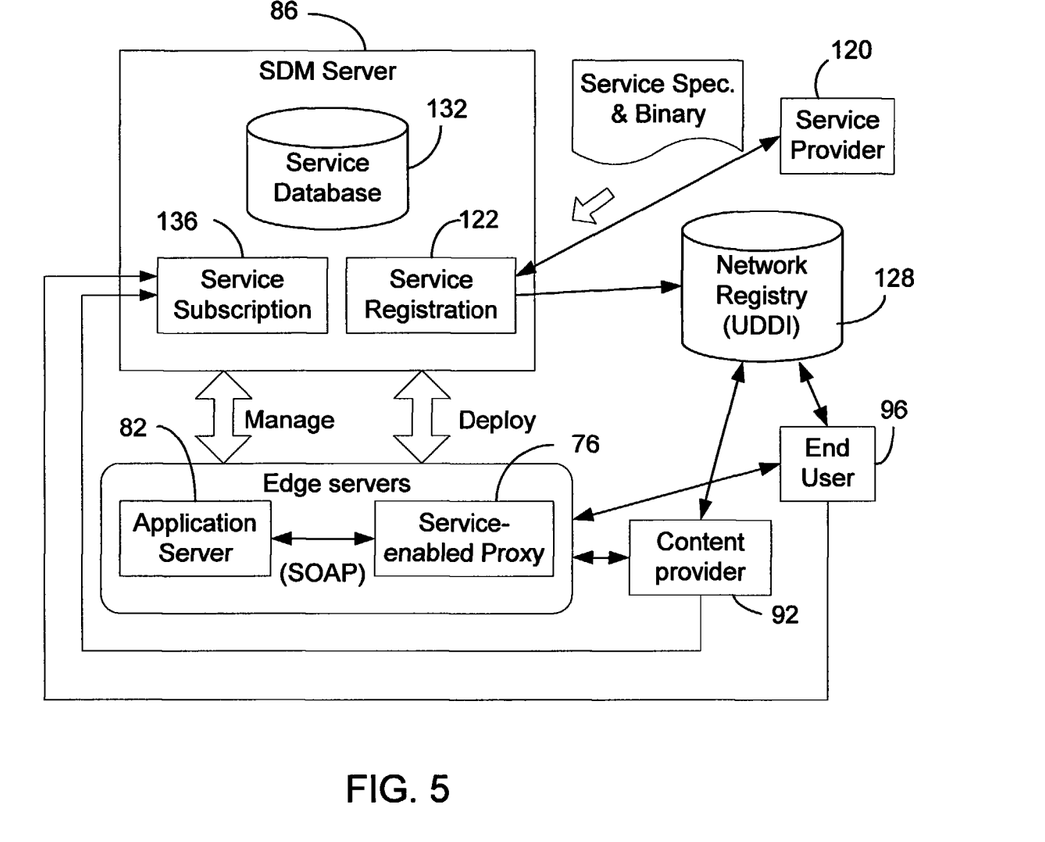
FIG. 5 is a schematic diagram showing communications among service subscribers and servers of the service delivery network for service registration and deployment.

As mentioned above, the content service network provides the necessary-network infrastructure to distribute and deploy content-oriented services as a form of intermediary service that can be used by either content providers or content consumers. Before a content-oriented service is made available, it has to be registered with the content service network first. As shown in FIG. 5, the service provider 120 provides its content-oriented service components, including service specifications and binaries, to the service registration component 122 of the SDM server 86. For each registered service, a service specification is provided to describe the invocation interface and execution environment of the service, such as the parameter types and transport protocols that the service operates on, and the conditions (e.g., content type, user preference, device capability, location, and network bandwidth, etc.) to invoke the service in the edge servers. The binaries include applications running on application servers and executable modules running on service-enabled proxies.

The SDM server 86 stores the service specification and binary code submitted by the service providers in the service database 132. It then publishes the service information to a network registry 128 for public discovery and access. In a preferred embodiment, the network registry 128 is a Universal Description, Discovery and Integration (UDDI) registry. The UDDI registry is an open and global registry that allows businesses to register information about their Web services so that other businesses can find them. The content service network 70 uses UDDI to publish content-oriented services for public discovery and access. SDM servers provide service subscription, unsubscription, query and configuration interfaces so that end users or content providers who are interested in a particular service according to service type specifications found in UDDI may send their requests to the content service network.

Along with the service registration and publication, the corresponding application or executable module for the registered service is provided to the SDM servers 86 of the service delivery overlay 80. The SDM servers 86 dynamically select a number of edge servers to deploy the service based on the estimated demand and required geographical coverage.

As mentioned above, there are two types of edge servers in the content service network for hosting applications and executable modules. The lightweight services can be provided as executable modules uploaded to the service-enabled proxies in the content delivery layer and executed on contents passing therethrough. Heavyweight services, on the other hand, are installed in the application servers and invoked by the service-enabled proxies through communications under the SOAP protocol.

One basic requirement for enabling content-oriented intermediary services is the ability to determine whether the content (e.g., HTTP messages) passing through the content delivery network should be serviced and, if so, how to invoke the service (i.e., finding the corresponding service instructions). Because service subscription contracts are between the service providers and the ends of the communications such as the content origin servers and/or the clients, a way is needed to make the edge servers aware of the binding between the subscribed services and the content requested or delivered by the subscriber (which may be either a content provider or a content consumer).

There are different solutions to the issue of service subscription and binding. One approach is to label the content (e.g., HTTP messages) to indicate that it requires special handling. There are at least two different ways for content labeling. The service instructions may be embedded directly into the content (e.g., HTTP headers). Alternatively, the label may be an indicator, such as a URI, that refers to an external document that contains the service instructions. Both methods, however, require changes to be made on the content origin servers (if the subscriber is a content provider) or the user agents in the client devices (if the subscriber is an end user). The need to modify existing content servers and/or clients may present an obstacle to the deployment of the content service network.

In accordance with a feature of the invention, a different approach to the service-content binding is used. Under this approach, the subscriber and the service provider agree on the service contract, and the content service network translates that contract into a service binding. The service binding describes the association between the subscribed service and the identity of the subscriber that is pertinent to the network communications involved in the content delivery process. For instance, if the subscriber is an end user, the identity data may represent the end user's identity. If the subscriber is the content provider, the identity data may represent the domain name or media objects of the content provider. Service bindings are maintained by the content service network, which knows the current status of subscription and constantly updates the service-enabled proxies with the latest service instructions, as will be described in greater detail below. The subscriber or the service provider only has to interact with the content service network. This allows the content-oriented services to be delivered transparently in the existing infrastructures of the network 72.

To subscribe to the content-oriented services, a content provider or content consumer first finds the services it wants in the UDDI registry 128, and then follows the access point to the content service network's service subscription interface 136. Once the subscriber confirms the service subscription and related configuration, the content service network stores the service binding information in the service database 132. The binding enables future rendering of the subscribed services to the relevant contents when they are delivered using the content delivery network. It also contains the conditions for invoking the services.

By way of example, two exemplary service binding data structures in the XML format are provided below. In the first example, the service subscriber is an end user, and the subscribed service is web page adaptation. The user ID is used for binding the service to the messages from or to this user. In the second example, the subscriber is a content provider, and the subscribed service is watermarking. The content provider's domain name is used for binding the service to content messages sent by the content provider.

Example 1

```
<binding type="end user">
    <user id="R&$%ABCD"/>
    <service name="web page adaptation">
        <condition>
            <condition name="user-agent" matches="Packet PC"/>
            <operator name="and"/>
            <condition name="MIME-type" matches="text/html"/>
        </condition>
    </service>
</binding>
```

Example 2

```
<binding type="content provider">
    <domain name=www.microsoft.com/>
    <service name="watermarking">
        <condition>
            <condition name="MIME-type" matches="image/jpeg"/>
            <operator name="and"/>
            <condition name="request-path" matches="/gallery/*"/>
        </condition>
    </service>
</binding>
```

As mentioned above, a service instruction represents a binding to a single service and contains the actual service access point in the service delivery overlay. The service instructions are transferred from the SDM servers to the service-enabled proxies that the subscriber is associated with so that each proxy will act according to the instructions to render services for the subscriber at appropriate moments. In this regard, if the subscriber is a content provider, it is associated with the proxies when it makes a contract with the CDN provider that owns the proxies to deliver its contents. If the subscriber is an end user, it is associated with the proxies when its ISP makes a contract with the CDN provider who owns the proxies to accelerate content access. The instruction transfer from the SDM servers to the service-enabled proxies may be in an "eager" mode in which a SDM server sends the instructions to the proxy immediately after the subscription, or in a "lazy" mode in which the proxy fetches the instructions from a SDM server for the subscriber on a periodic or per-session basis. As mentioned above, the proxy has a cache/replicated memory 110 for storing service instructions representing a subset of service bindings for its domain. The proxy keeps the service instructions in the cache up-to-date.

As mentioned above, each service-enabled proxy 76 in the content delivery network is sitting in the content delivery path between a content provider and a content consumer (e.g., an end user). When the proxy receives a message that contains a content request from the content consumer or the requested content from the content provider, it determines whether content-oriented services should be applied to the message according to the instructions. If the message and its related context satisfy the conditions specified in the instructions for providing a subscribed service, the proxy 76 either provides the service locally or passes the message and related parameters to the application servers in the service delivery layer. In the latter case, the processed result is returned to the proxy, which then forwards the result the original destination of the message.

Figure 6:
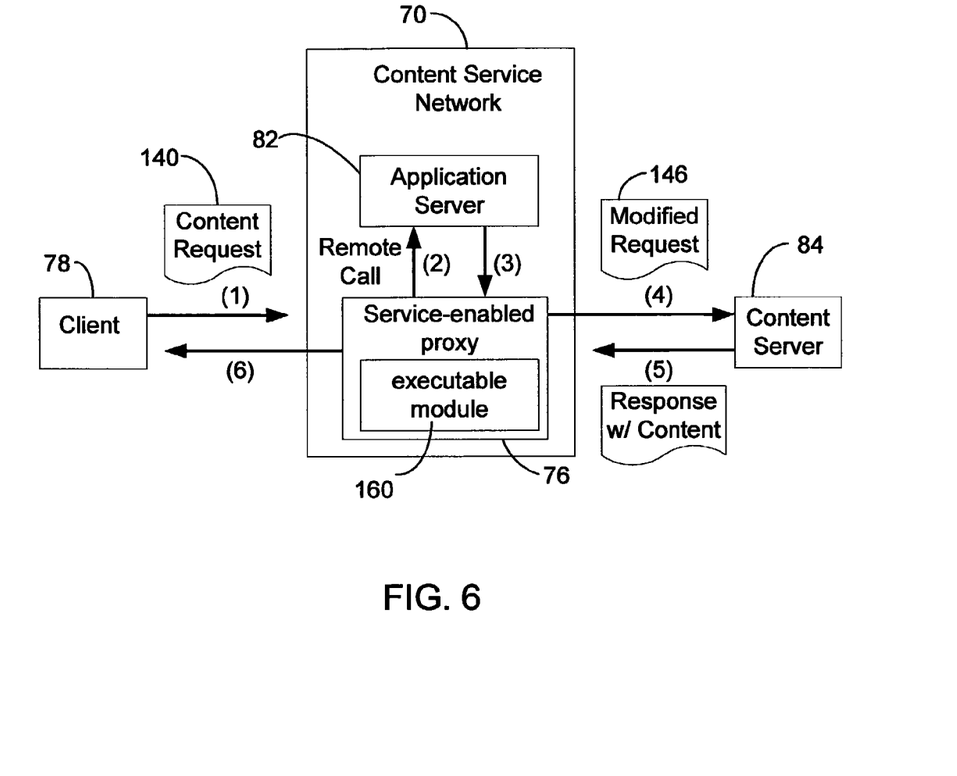
FIG. 6 is a schematic diagram showing a sequence of communications involved in the rendering of a content-oriented service on a request message sent by a client to a content server.

Content-oriented services may be rendered on either the client request or the server response of a session. Request filtering and security adaptation are of the former type, while many other services, such as web page adaptation, watermarking, virus scanning, etc., are of the latter type. FIG. 6 shows the data flow involved in the case of providing service on a client request. For illustration purposes, the sequence of communications between the parties in this process is indicated by numbered arrows. As shown in FIG. 6, the client 78 first sends a request message 140 for content from a content origin server 84. This message is first routed to the service-enabled proxy 76, which checks the message against the service binding for the client's service subscription (e.g., matching the user ID in the message with the user ID in the binding) and determines that the message needs a content-oriented service. Depending on the type of service to be rendered, the proxy 76 may forward the message to a remote application server 82 in the service delivery overlay, or invoke a local executable module 160 for the service. In the former case, the application server 82 processes the message according to the service contract, and returns the result, e.g., a modified request message, to the proxy. The proxy then forwards the modified request 146 (assuming that the processing result allows the modified request to be forwarded) on to the content server 84. In response to the client's request, the content server 84 returns a response message 148 containing the requested content. The response message 148 is routed to the proxy 76, which then forwards the response message to the requesting client 78.

Figure 7:
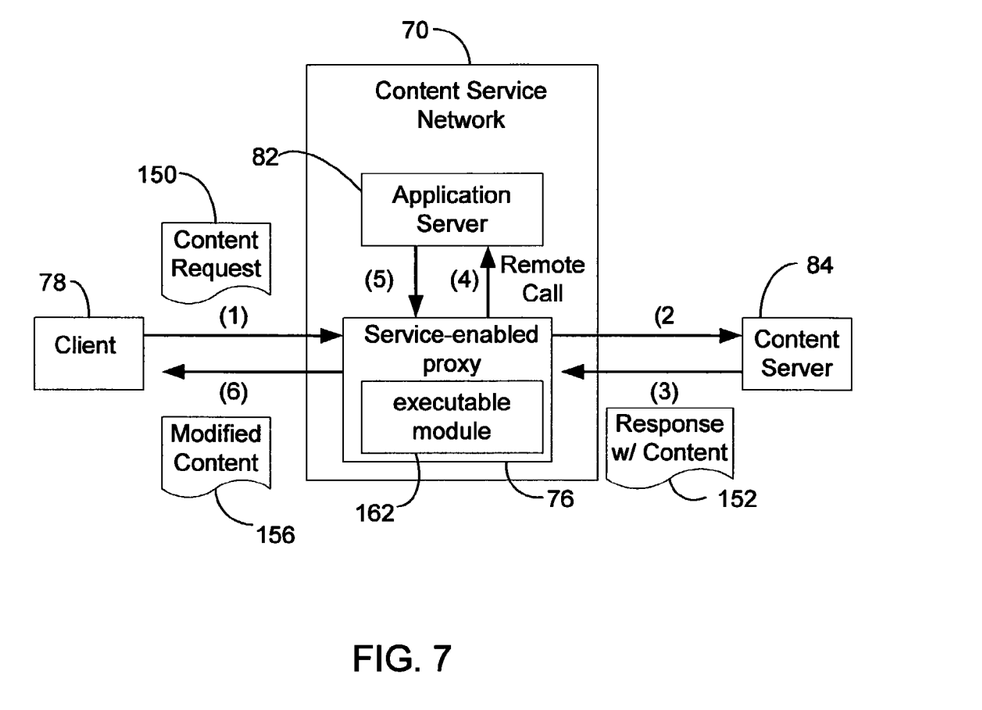
FIG. 7 is a schematic diagram showing a sequence of communications involved in the rendering of a content-oriented service on a response message sent by a content server to a client.

FIG. 7 shows the data flow in the case of rendering services on response messages. Similar to FIG. 6, the sequence of communications between the parties is indicated by numbered arrows. As shown in FIG. 7 the client first sends a request message 150. This request message is passed through the proxy 76 and forwarded to the content server 84. In response, the content server returns a response message 152. The response message 152 is routed to the proxy 76. When the proxy 76 receives the response message 152, it checks if the message requires any content-oriented service by, for example, finding a match between the domain name of the content server 84 and the domain name in a service binding. If so, the proxy 76 causes the service to be rendered according to the service instructions associated with the service binding by either forwarding the message to an application server 82 that performs the service processing on the message, or to process the message itself by invoking a local executable module 162. If the processing is performed by the application server, the modified content resulting from the processing is returned by the application server 82 to the proxy 76. The modified content 156 is then forwarded to the client 78.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A content service network for providing content-oriented services on contents delivered over a wide-area network, comprising:
a content delivery network having a plurality of service-enabled proxies positioned at edge servers disposed in content delivery paths between content providers and content consumers on the wide-area network; and
a service delivery overlay having a plurality of application servers each distinct from the service-enabled proxies, the plurality of application servers for performing content processing for rendering content-oriented services and at least a service management server for managing service subscriptions, the service management server having a service subscription component for receiving service subscriptions for content-oriented services from subscribers, creating for each subscribed service a service instruction including service binding data identifying a subscriber for said each subscribed service and identifying said each subscribed service, and distributing the service instructions to the service-enabled proxies positioned at the edge servers such that when the service management server is in an eager mode, the service management server distributes the service instructions immediately after receiving a service subscription and when the service management server is in a lazy mode the service-enabled proxy fetches the service instructions from the service management server on a periodic basis, the service management server for distributing applications for performing services to the application servers and executable modules for performing services to the service-enabled proxies,
each of the service-enabled proxies having
an instruction cache for storing service instructions received from the service management server
a content cache for storing content received from a content provider in response to a content request and
being programmed
to receive a content request from a client machine, when the requested content is not stored in the content cache to forward the content request to a content provider, to receive the requested content from the content provider, and to store the requested content in the content cache, and when the requested content is stored in the content cache, to retrieve the requested content from the content cache,
to match a message associated with the requested content against service binding data of the service instructions in the instruction cache to identify a service to be rendered on the requested content, retrieving a service instruction associated with the identified service, and executing the associated service instruction to render the identified service on the requested content, including calling a remote service of a remote application server in the service delivery overlay to perform content processing required for the identified service on the requested content and receiving a modified content in return when the associated service instruction calls for remote processing by executing an application distributed by the service management server and calling a local service of the edge server at which a service-enable proxy is positioned to perform content processing for the identified service on the requested content when the associated service instruction calls for local processing by executing an executable module distributed by the service management server, and
to send the modified content to the client machine.

2. A content service network as in claim 1, wherein the wide-area network is the Internet.

3. A content service network as in claim 1, wherein the service management server further includes a service registration component for receiving service registrations from providers of content-oriented services to be deployed in the content service network.

4. A content service network as in claim 3, wherein the service registration component is programmed to send information on registered services to a network registry.

5. A content service network as in claim 1, wherein the service delivery overlay further includes a plurality of redirection servers for directing calls for content processing from the service-enabled proxies to the application servers.

6. A content service network as in claim 1, wherein the service subscription component is programmed to create for an end user as a service subscriber a service instruction having service binding data containing an identification of the user.

7. A content service network as in claim 6, wherein the service subscription component is programmed to create for a content provider as a service subscriber a service instruction having service binding data identifying a domain name of the content provider.

8. A content service network as in claim 1, wherein each service-enabled proxy includes an instruction cache for storing service instructions.

9. A content service network as in claim 8, wherein each of the service instructions includes conditions for rendering a service associated with said each service instruction.

10. A content service network as in claim 1, wherein each service-enabled proxy includes a content cache for caching contents delivered therethrough to content consumers on the wide-area network.

11. A service-enabled proxy positioned at an edge server of a content delivery network of a content service network, the edge server in content delivery paths between content providers and content consumers on a wide-area network for providing content-oriented services, comprising:
a service instruction cache for storing service instructions, each service instruction having service binding data identifying a service subscriber and specifying a subscribed content-oriented service and representing a contract between a subscriber and a service provider, the service instruction being provided to the service-enabled proxy by a service management server of a service delivery overlay of the content service network through which the subscriber and the service provider agreed to the contract such that when the service management server is in an eager mode, the service management server distributes the service instructions immediately after receiving a service request and when the service management server is in a lazy mode the service-enabled proxy fetches the service instructions from the service management server on a periodic basis;
a message parser for parsing a message passing through the service-enabled proxy for extracting information for identifying, based on the service binding data of the service instructions, a content-oriented service to be rendered on the message;

an instruction processor for loading a service instruction associated with the identified content-oriented service from the service instruction cache; and a service execution module for executing the loaded service instruction to cause rendering of the identified content-oriented service on the message, the service execution module being programmed to make a remote call to a remote application server for performing content processing on the message to render the identified content-oriented service when the loaded service instruction calls for remote processing and being programmed to make a local call to a local service of the edge server for performing content processing on the message to render the identified content-oriented service when the loaded service instruction calls for local processing, the service execution module including an execution module for performing a service that was distributed to the service-enabled proxy by the service management server.

12. A service-enabled proxy as in claim 11, further including an instruction parser for parsing services instructions received from a service management server.

13. A service-enabled proxy as in claim 11, further including a result cache for caching results of content processing on the message performed for rendering the identified content-oriented service.

14. A service-enabled proxy as in claim 11, wherein each of the service instructions includes data representing conditions for the service-enabled proxy to determine whether to render the content-oriented service identified in said each service instruction.

15. A storage device having computer-executable instructions for a service-enabled proxy at an edge server of a content delivery network of a content service network, the edge server in content-delivery paths between content providers and content consumers on a wide-area network to performs steps for providing content-oriented services, the steps comprising:

receiving a message routed along a content delivery path;

determining whether the message requires an associated content-oriented service based on service binding data for service instructions stored in an instruction cache, each service instruction being constructed for a corresponding subscribed content-oriented service and including service binding data identifying a subscriber of said corresponding subscribed content-oriented service and specifying said corresponding subscribed content-oriented service, the service instruction being provided to the service-enabled proxy by a service management server of a service delivery overlay of the content service network such that when the service management server is in an eager mode, the service management server distributes the service instructions immediately after receiving a service request and when the service management server is in a lazy mode the service-enabled proxy fetches the service instructions from the service management server on a periodic basis, each service instruction representing a contract between a subscriber and a service provider such that the service provider will provide a subscribed to service to the subscriber;

loading a service instruction for the associated content-oriented service for the message from the instruction cache; and executing the loaded service instruction to render the associated content-oriented service for the message, including making a remote call to a remote application server to perform content processing on the message to render the associated content-oriented for the message when the loaded service instruction calls for remote processing and making a local call to a local service of the edge server to perform content processing on the message to render the associated content-oriented for the message when the loaded service instruction calls for local processing, the service execution module including an execution module for performing a service that was distributed to the service-enabled proxy by the service management server.

16. A storage device as in claim 15, wherein the step of determining includes parsing the message to retrieve relevant information.

17. A storage device as in claim 15, having further computer-executable instructions for performing the step of storing results of content processing of the message in a result queue.

18. A storage device as in claim 15, having further computer-executable instructions for performing the steps of parsing service instructions received from a service management server and storing the parsed service instructions in the service instruction cache.

19. A storage device as in claim 15, having further computer-executable instructions for performing the step of determining whether services conditions of the loaded service instruction are met before executing said loaded service instruction to render the associated content-oriented service on the message.

* * * * *